United States Patent
Eckelmann-Wendt et al.

(10) Patent No.: US 10,862,675 B2
(45) Date of Patent: Dec. 8, 2020

(54) METHOD FOR EXCHANGING MESSAGES BETWEEN SECURITY-RELEVANT DEVICES

(71) Applicant: SIEMENS MOBILITY GMBH, Munich (DE)

(72) Inventors: Uwe Eckelmann-Wendt, Wolfenbuettel (DE); Stefan Gerken, Braunschweig (DE)

(73) Assignee: Siemens Mobility GmbH, Munich (DE)

( * ) Notice: Subject to any disclaimer, the term of this patent is extended or adjusted under 35 U.S.C. 154(b) by 225 days.

(21) Appl. No.: 16/088,861

(22) PCT Filed: Mar. 1, 2017

(86) PCT No.: PCT/EP2017/054749
§ 371 (c)(1),
(2) Date: Sep. 27, 2018

(87) PCT Pub. No.: WO2017/167527
PCT Pub. Date: Oct. 5, 2017

(65) Prior Publication Data
US 2019/0132119 A1    May 2, 2019

(30) Foreign Application Priority Data

Mar. 29, 2016 (DE) .................... 10 2016 205 122

(51) Int. Cl.
*H04L 29/06* (2006.01)
*H04L 9/08* (2006.01)
(Continued)

(52) U.S. Cl.
CPC .............. *H04L 9/0819* (2013.01); *H04L 9/14* (2013.01); *H04L 9/3073* (2013.01);
(Continued)

(58) Field of Classification Search
CPC ............ H04L 63/04; H04L 9/00; G06F 21/60
See application file for complete search history.

(56) References Cited

U.S. PATENT DOCUMENTS

2007/0195960 A1    8/2007  Goldman et al.
2017/0139388 A1    5/2017  Sachs et al.

FOREIGN PATENT DOCUMENTS

CN    101179374 A    5/2008
CN    101321057 A    12/2008
(Continued)

OTHER PUBLICATIONS

Alfred J. Menezes, et al.; "Handbook of Applied Cryptography"; Oct. 1996; pp. 425-488; CRC Press.
(Continued)

*Primary Examiner* — Izunna Okeke
(74) *Attorney, Agent, or Firm* — Laurence Greenberg; Werner Stemer; Ralph Locher

(57) ABSTRACT

A method exchanges messages with different security classes between security-relevant devices. Key pairs containing a private key and a public key corresponding to the private key are assigned to each security class, wherein the keys and key pairs of each security class differ from each other. Each security-relevant device has all the public keys for decrypting messages for each security class and the relevant private keys for encrypting messages corresponding to a security class that is lower than or equal to the security class of the security-relevant device. Upon receipt, the security class for the message is identified by decryption by use of the public key.

8 Claims, 2 Drawing Sheets

(51) Int. Cl.
    *H04L 9/32*         (2006.01)
    *H04L 9/14*         (2006.01)
    *H04L 9/30*         (2006.01)

(52) U.S. Cl.
    CPC ........ *H04L 9/3247* (2013.01); *H04L 63/0442* (2013.01); *H04L 63/105* (2013.01)

(56) References Cited

FOREIGN PATENT DOCUMENTS

| | | | | |
|---|---|---|---|---|
| CN | 101917275 | A | 12/2010 | |
| CN | 103618607 | A | 3/2014 | |
| CN | 104618396 | A | 5/2015 | |
| DE | 102014111361 | A1 | 2/2016 | |
| EP | 2728824 | A1 | 5/2014 | |
| WO | WO-2016032752 | A1 * | 3/2016 | ......... H04L 63/0281 |

OTHER PUBLICATIONS

Gansen Zhao, et al.; "Distributed Key Management for Secure Role based Messaging"; Proceedings of the 20th International Conference on Advanced Information Networking and Applications; 2006; IEEE Computer Society.

* cited by examiner

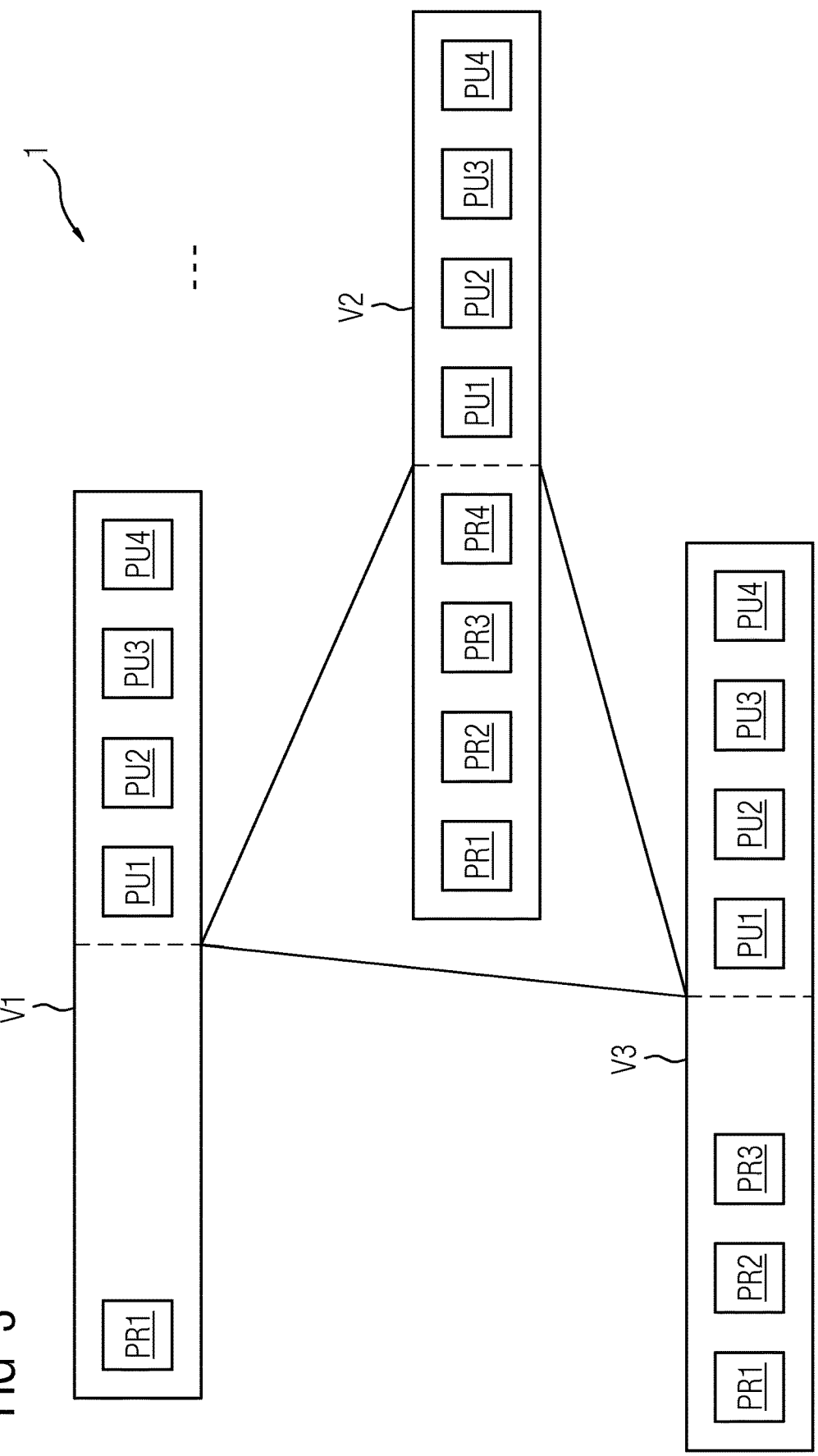

METHOD FOR EXCHANGING MESSAGES BETWEEN SECURITY-RELEVANT DEVICES

BACKGROUND OF THE INVENTION

Field of the Invention

The invention relates to a method for exchanging messages between security-relevant apparatuses and a communication system for carrying out the method.

In a communication system, security-relevant apparatuses of different levels of criticality or different security classes can be present. Such security classes evaluate the requirements, for example, for the reliability and integrity of security functions of security-relevant apparatuses, for example, a device, a system, a program, a machine, a plant, a process, etc. The higher the security class, the higher is the level of security and reliability and therefore the lower is the risk of a failure and/or the greater is the risk reduction. In relation to the standard EN50129, this would be, for example, security-relevant apparatuses for the safety integrity level SIL 0, 1, 2, 3 or 4. In a communication system, it should be prevented that a sender of a lower security class, for example SIL 1 can send a message such that it erroneously appears to a receiver unit as if it came from a sender of a higher security class, that is, for example SIL 2, 3, or 4. Conventionally, this has been solved in that the communication systems of the communication partners of different security classes have been physically separated from one another. Otherwise, it had to be shown explicitly that communication partners of a lower security class cannot generate valid messages of a higher security class. For example, it has conventionally been realized that exclusively messages of the same security class are sent (e.g. the protocols SAHARA, RaSTA, Secly, DevCycly, PDS, SBS, WNC+, ProfiSafe, BuRep, SEuzi, . . . ).

SUMMARY OF THE INVENTION

It is an object of the invention to propose a method for the exchange of messages between security-relevant apparatuses in a communication system, wherein an unintended, accidental spoofing of a higher security class should be identifiable.

The inventive method for exchanging messages between security-relevant apparatuses fundamentally comprises the following steps. In a first step a) a plurality of security-relevant apparatuses linked to one another is provided, wherein each security-relevant apparatus is assigned to a particular security class. In a further step b) pairs of keys comprising a private key and a corresponding public key matching it are assigned to each security class, wherein the keys and pairs of keys of each corresponding security class each differ from one another. In a further step c) the public keys are made available to each security class of each security-relevant apparatus. In a further step d), the private keys of each security-relevant apparatus are made available according to a security class that is lower than or equal to the security class of the respective security-relevant apparatus. In a further step e), a message is sent by a security-relevant apparatus and is encrypted with a private key of a particular security class that is available to the security-relevant apparatus. In a further step f), a message is received by one or more security-relevant apparatuses and the security class of the message is identified by decryption of the message with the public key of the same security class as the private key used for encrypting in step e).

A security-relevant apparatus can be, for example, a control unit, control device, computer, program, software, hardware, machine, device, component, a system unit or a plant unit, etc. which is configured for a particular security class and exchanges messages with other security-relevant apparatuses. In the context of the invention, a security-relevant apparatus is assigned to a security class. The apparatus communicates with other security-relevant apparatuses by means of messages. Simplifying, in place of a message which originates from a security-relevant apparatus with a security class assigned to it, it is agreed below that a message is assigned to a security class. A security-relevant apparatus can encrypt and/or sign messages of the same or a lower security class, wherein the transmitting or receiving can take place, for example, via an associated or integrated communication unit. Furthermore, the security-relevant apparatus can sign and/or encrypt messages by means of a private key as well as decrypting received signatures with public keys. Through a comparison of the received message with the decrypted signature, a verification takes place. In the event of a match, it is ensured that the security class of the public key used for decryption matches the security class of the message, by which means the security class of the message is unambiguously identified. This can be explicitly or implicitly known to the receiving security-relevant apparatuses. Furthermore, through the successful decryption, the integrity is also tested, that is, the unalterability of the transferred message.

The method has the advantage that no accidental spoofing of a higher security class through faulty technology remains unnoticed. Such an accidental spoofing can be, for example, program error-related or hardware error-related.

Intentional spoofing of a higher security class is not covered by the invention. In such a case of an accidental spoofing of a higher security class, the corresponding public key for this spoofed security class of the received security-relevant apparatus cannot achieve a decryption. Furthermore, the actual security class for the message can then actually be identified by finding the relevant public key.

In addition, advantageously, in a protocol of a communication system, messages of different security classes can now be exchanged. A physical separation for messages of different security classes is therefore no longer required. An accidental masquerade (spoofing of a false sender) to a higher security class can be disregarded. Furthermore, this method can also be entered retrospectively into existing protocols, since it does not alter the structure of the data units of the protocol.

Preferably, the encrypted message comprises the actual message content and an encrypted check value appended thereto. As check values, preferably hash values are used for this. Alternatively, however, CRC (cyclic redundancy checking), checksums, digests, etc. can be used as safety codes. Check values such as hash values serve to represent messages of any length at a fixed length by means of hash functions. By this means, the data volume for the signing or encryption is reduced.

Preferably, an integrity check also takes place by checking the identity of the decrypted check value with the check value calculated from the transmitted message. In the event of a match, the security class of the message is identified which matches the security class of the public key used.

The integrity is also checked. Herein, the length of the check value also does not have to be extended. A protocol extension (e.g. in the case of RaSTA) is thus easily possible, since the check value creation can already also secure additionally covered data such as, for example, session identification.

Preferably, the decryption takes place by means of a security-relevant apparatus through the use of all the public keys of the different security classes until the encrypted message or the encrypted check value is decrypted by means of a public key of one security class. In this way, the security class of the message does not need to be known to the receiving security-relevant apparatus. The identification of the security class then takes place by means of the security class of that public key which leads to a decryption of the message or of the check value.

The security classes can have a safety integrity level of 0, 1, 2, 3, 4. These are the security classes of the standards IEC61508 and IEC61511 or the standard EN50129.

At least one security-relevant apparatus preferably has a safety integrity level of greater than or equal to 1.

Preferably, the private key multiplied by the public key from the same security class results in the residue class 1, wherein thereby the original check value or the original message is again obtained. This method is an asymmetrical encryption that is favorable from the standpoint of runtime. The execution speed lies in the region of microseconds (1 $\mu s=10^{-6}$ s) or less. This particularly simple and rapid asymmetrical encryption is suitable in particular since it involves only the recognition of accidental misconduct.

Furthermore, a communication system is proposed for carrying out the method, which comprises a plurality of security-relevant apparatuses, which are connected to one another and are each assigned to a particular security class. According to the invention, each security-relevant apparatus has each public key of all the security classes for decrypting a message or a check value and, for encrypting a message or a check value, private keys up to the security class for which the respective security-relevant apparatus is configured.

This communication system has the advantages of the inventive method. In particular, there results the advantage that it can exchange messages with different security classes between the security-relevant apparatuses, wherein by means of the assignment of the security classes to the corresponding keys, an identification of the security class of the message is enabled. The same protocol (e.g. RaSTA) can therefore be used for a communication system for transferring messages of different security classes.

Furthermore, a computer program is proposed which enables a data processing facility to carry out, once it has been loaded into the storage medium of the data processing facility, a method for the exchange of security-relevant apparatuses.

Furthermore, a computer program is proposed which enables a data processing facility to carry out, once it is loaded into the storage medium of the data processing facility, a method for the exchange of security-relevant apparatuses.

BRIEF DESCRIPTION OF THE SEVERAL VIEWS OF THE DRAWING

The above-described properties, features and advantages of this invention and the manner in which these are achieved will now be described more clearly and explicitly with the following description of the exemplary embodiments, and by reference to the drawings, in which:

FIG. 3 is a schematic representation of a communication system for carrying out the method for the exchange of messages with different security classes, according to an exemplary embodiment.

DESCRIPTION OF THE INVENTION

Figure 1:
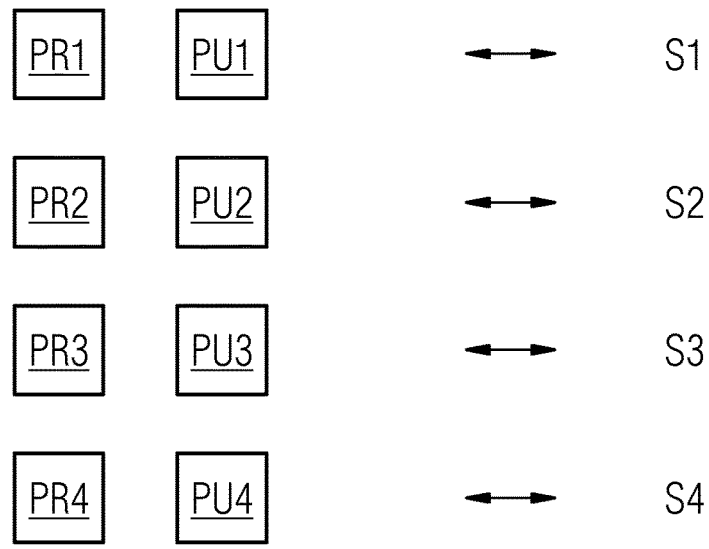
FIG. 1 is a schematic representation of a fixed assignment of pairs of keys to security classes.

FIG. 1 is a schematic representation of a fixed assignment of pairs of keys to security classes S1, S2, S3, S4. The number of security classes S1, S2, S3, S4 is herein selected as being four, by way of example. In principle, however, as many security classes as desired can exist. Of significance, for example, is the security class the safety integrity level SIL of 0, 1, 2, 3, 4 of the standards IEC 61508 and IEC61511 or the standard EN50129. At least one security-relevant apparatus preferably has a safety integrity level of greater than or equal to 1. The security classes are also not restricted to these standards. Beyond these standards, different security levels and different security requirements are also included by the invention.

The pairs of keys comprise a private key PR1, PR2, PR3, PR4 and a public key PU1, PU2, PU3, PU4 matching it. Matching is here intended to mean that a message or a check value encrypted with the respective private key PR1, PR2, PR3, PR4 can be decrypted by means of the respective public key PU1, PU2, PU3, PU4. These are firmly assigned to each security class S1, S2, S3, S4 and the keys and pairs of keys differ from one another in each case. There are thus preferably just as many pairs of keys as there are security classes S1, S2, S3, S4, including when a different number of security classes S1, S2, S3, S4 is present. In other embodiments, a plurality of pairs of keys can also be present for each security class. Purely by way of example, it is herein agreed that the security classes S1, S2, S3, S4 fulfill the order S4>S3>S2>S1 in respect of security requirements, that is, for example the security class S3 is higher than the security class S2, etc. It is further agreed that the private key PR1 and the public key PU1 are firmly assigned to the security class S1, the private key PR2 and the public key PU2 are firmly assigned to the security class S2, the private key PR3 and the public key PU3 are firmly assigned to the security class S3 and the private key PR4 and the public key PU4 are firmly assigned to the security class S4.

Figure 2:
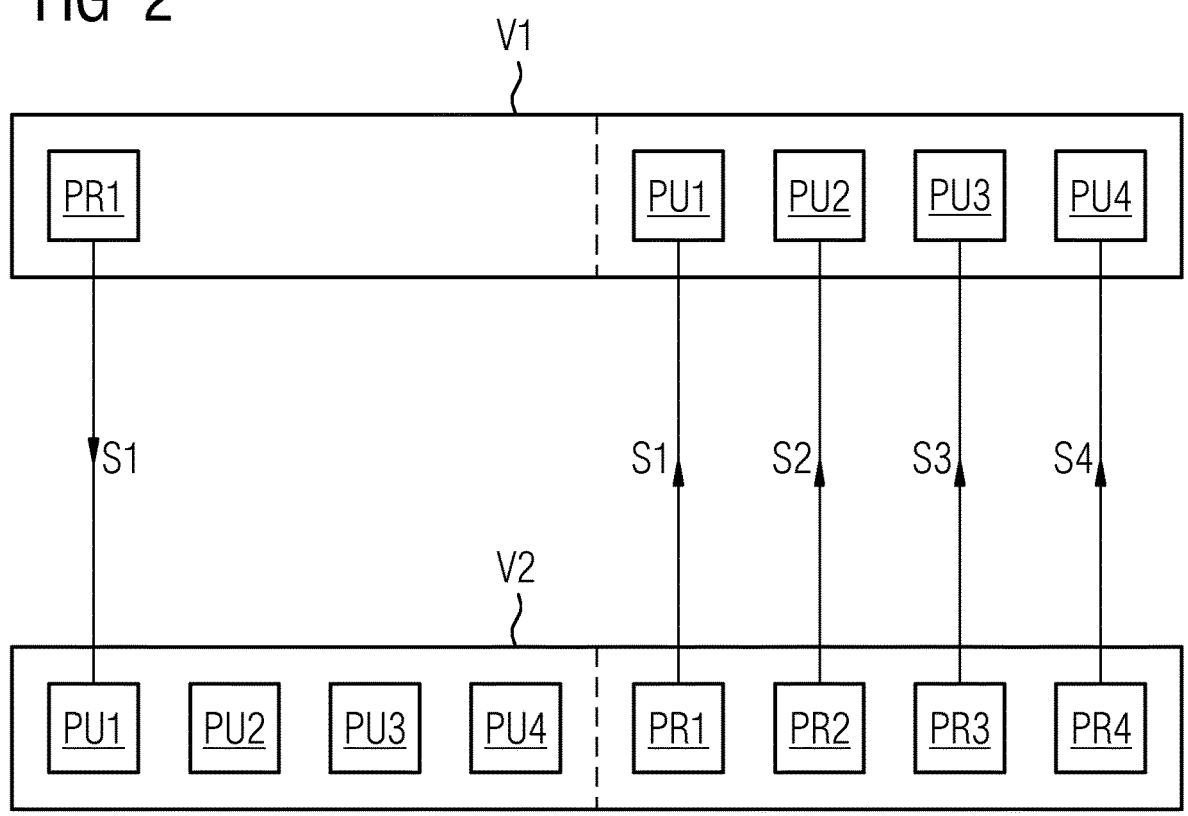
FIG. 2 is a schematic representation of the inventive method for the exchange of messages with different security classes according to an exemplary embodiment.

FIG. 2 shows a schematic representation of the inventive method for the exchange of messages with different security classes according to an exemplary embodiment.

Herein, for example, two security-relevant apparatuses V1, V2 that are connected to one another are provided. However, the invention is not restricted to two security-relevant apparatuses V1, V2. As many security-relevant apparatuses as desired connected to one another as desired can be provided, but at least two. Each security-relevant apparatus V1, V2 is herein assigned to a particular security class S1, S2, S3, S4. A security-relevant apparatus V1, V2 can be, for example, a control unit, control device, computer, program, software, hardware, machine, device, component, a system unit or a plant unit, etc. which is configured for a particular security class and exchanges messages with other security-relevant apparatuses V1, V2. In the context of the invention, a security-relevant apparatus K1, K2 is assigned to a security class S1, S2, S3, S4. The apparatus communicates with other security-relevant apparatuses K1, K2 by means of messages. Simplifying, in place of a message which originates from a security-relevant apparatus K1, K2 with a security class S1, S2, S3, S4 assigned to it, it is agreed below that a message is assigned to a security class. A security-relevant apparatus V1, V2 of this type can encrypt and/or sign messages of the same or a lower security class, wherein the transmitting or receiving can take place, for example, via an associated or integrated communication unit. Furthermore, the security-relevant apparatus V1, V2 can sign and/or encrypt messages by means of a private key as well as decrypting received signatures with public keys.

Furthermore, the private keys PR1, PR2, PR3, PR4 of each security-relevant apparatus V1, V2 are made available according to a security class S1, S2, S3, S4 that is lower than or equal to the security class S1, S2, S3, S4 of the respective security-relevant apparatus V1, V2. In this exemplary embodiment of FIG. 2, the security-relevant apparatus V1 is configured for the security class S1 and thus possesses only the private key PR1. The security-relevant apparatus V2 is configured, by way of example, for the security class S4, so that the security-relevant apparatus V2 has all the private keys PR1, PR2, PR3, PR4.

The communication types of the security-relevant apparatuses V1, V2 are shown, by way of example, with direction arrows. The security-relevant apparatus V1 has only the private key PR1 available and thus only messages of the security class S1 can be sent and encrypted with the private key PR1 that is available, which is indicated by an arrow with the direction from the security-relevant apparatus V1 to the security-relevant apparatus V2. The security-relevant apparatus V2 has the private keys PR1, PR2, PR3, PR4 available. Therefore messages of the security classes S1, S2, S3 and S4 can be sent and encrypted by the security-relevant apparatus V2 with the private keys PR1, PR2, PR3 and PR4, which is represented by four arrows in the direction from the security-relevant apparatus V2 to the security-relevant apparatus V1.

Since both security-relevant apparatuses V1, V2 have all the public keys PU1, PU2, PU3, PU4, all the encrypted messages of each security class S1, S2, S3, S4 can be received and/or decrypted. For example, the security-relevant apparatus V1 can receive the encrypted message of all the security classes S1, S2, S3, S4 from the security-relevant apparatus V2 and decrypt it with the respectively matching public key PU1, PU2, PU3, PU4. The security-relevant apparatus V2 can decrypt the encrypted message from the security class S1 with the public key PU1.

By means of the unambiguous assignment undertaken, as for example shown in FIG. 1, the security class S1, S2, S3, S4 corresponds to the respective encrypted or signed message of security class S1, S2, S3, S4 of the respective successfully decrypted public key PU1, PU2, PU3, PU4. Therefore from the successfully decrypted public key PR1, PR2, PR3, PR4, an unambiguous identification of the security class S1, S2, S3, S4 of the message is ensured.

For example, in FIG. 2, the security-relevant apparatus V1 can transfer a message of the security class S1 to the security-relevant apparatus V2. The encryption by the private key S1 can thus only be successfully verified or decrypted by the public key PU1. On use of another key, for example, the public key PU2, successful verification or decryption cannot take place.

If, for example, the security-relevant apparatus V1 were now to send a message which instead of the actual security class S1, spoofs the higher security class S2 (accidentally), then this spoofing can be identified. Specifically, the security-relevant apparatus V2 cannot decrypt the signature with the key PU2. This is also successful with the key PU1, so that the security-relevant apparatus V2 ascertains the actual security class S1.

The method therefore has the advantage that no accidental (e.g. program error-related or hardware error-related) spoofing of a higher security class remains unnoticed through faulty technology. Intentional spoofing of a higher security class is not covered by the invention. In addition, advantageously, in a protocol of a communication system, messages of different security classes can now be exchanged. A physical separation is therefore no longer required for messages of different security classes. An accidental masquerade (spoofing of a false sender) to a higher security class can be disregarded. Furthermore, this method can also be entered retrospectively into existing protocols, since it does not alter the structure of the data units of the protocol.

The encryption or signing is preferably not created on the message itself, but on a check value of the message. Preferable are the hash value or alternative CRC (cyclic redundancy checking), checksum, digest, etc., which can be used as safety codes. Check values such as hash values serve to represent messages of any length at a fixed length by means of hash functions. By this means, the data volume is advantageously reduced. In such a case, the verification or decryption then takes place by comparison of the decrypted check value with the check value formed from the transferred message. In the event of a match, this decryption is successful and the security class S1, S2, S3, S4 of the message is identified which matches the security class S1, S2, S3, S4 of the public key PU1, PU2, PU3, PU4 used. By means of the invention, the length of the check value does not have to be extended. A protocol extension (e.g. in the case of RaSTA) is therefore easily possible, since for example, the check value creation can already also secure additionally covered data such as, for example, session identification.

The decryption by means of a security-relevant apparatus can take place through the use of all the public keys of the different security classes until the encrypted message or the encrypted check value is decrypted. This can be demonstrated, by way of example, using FIG. 2. For example, the security-relevant apparatus V2 transfers a message with the security class S2 to the security-relevant apparatus V1. This security-relevant apparatus now tests all the public keys PU1, PU2, PU3, PU4 for decryption in any desired sequence. Then, the decryption succeeds using the key PU2, so that the security class S2 is identified for the message. The security class of the received message therefore does not need to be known to the receiving security-relevant apparatus, in this case the security-relevant apparatus V2. Alternatively, the security class S1, S2, S3, S4 can also simply be written into the message. Then the testing becomes unnecessary.

As a preferred variant of the use of an asymmetric encryption, a method described below is used. A private key PRn of an nth security class, denoted below as $pri_n$, results with the public key PUn of the same security class, denoted here as $pub_n$, through an operation, in the neutral element 1 in the residue class, that is $pri_n \otimes pub_n \equiv 1 \mod a^l$, where a is the number of possible values per character, l is the underlying character length, $a^l$ is the number of keys that differ from one another and $\equiv$ represents the congruence, where in the specific embodiment, for example, n can take the values n=1, 2, 3, 4. Accordingly, in the residue class, the public key PUn of the nth security class is the inverse element for the private key PRn. Typically, a binary system exists which therefore corresponds to a=2 and is the preferred variant.

The bit length l is often at l=128-160 bit, although shorter or longer bit lengths and therefore shorter and longer keys can thus be used.

As operations ⊗, various suitable operations come into consideration. For example, matrix operations are included. Preferably, however, the public key PUn multiplied by the private key PRn results in the residue class 1, wherein thereby the original check value or the original message is again obtained. The execution speed herein lies in the region of microseconds (1 μs=$10^{-6}$ s) or less. This particularly simple and rapid asymmetrical encryption is suitable in particular since it involves only the recognition of accidental misconduct.

FIG. 3 is a schematic representation of a communication system 1 for carrying out the method for the exchange of messages with different security classes, according to an exemplary embodiment. FIG. 3 shows a plurality of security-relevant apparatuses V1, V2, V3, in this case by way of example three, which are each connected to one another and are each assigned to a particular security class S1, S2, S3, S4. This network can be extended as desired. Each security-relevant apparatus V1, V2, V3 has each public key PU1, PU2, PU3, PU4 of all the security classes S1, S2, S3, S4 for decrypting a message or a check value and, for encrypting a message or a check value, private keys PR1, PR2, PR3, PR4 up to the security class S1, S2, S3, S4 for which the respective message of the security-relevant apparatus V1, V2, V3 is configured. The security-relevant apparatus V1 is identical to the security-relevant apparatus V1 of FIG. 2 and the security-relevant apparatus V2 is identical to the security-relevant apparatus V2 of FIG. 2. The security-relevant apparatus V3 has, by way of example, three private keys PR1, PR2, PR3 and can therefore accordingly encrypt or sign messages or check values of the security class S1, S2, S3. The security-relevant apparatus V3 is thus configured to transmit messages of security class S3 or lower.

Summarizing, what is proposed is a method for exchanging messages between security-relevant apparatuses. The method has the advantage that an accidental spoofing of a higher security class S1, S2, S3, S4 does not remain unnoticed. By this means, messages of different security classes can be transferred distinguishably in a protocol of a network.

Such an accidental spoofing of a higher security class through faulty technology can be, for example, program error-related or hardware error-related. Intentional spoofing of a higher security class is not covered by the invention. In such a case of an accidental spoofing of a higher security class S1, S2, S3, S4, the corresponding public key PR1, PR2, PR3, PR4 for this spoofed security class S1, S2, S3, S4 of the received security-relevant apparatus V1, V2, V3 cannot achieve a successful decryption. Furthermore, the actual security class S1, S2, S3, S4 for the message can then actually be identified by the matching relevant public key.

Although the invention has been illustrated and described in detail based on preferred exemplary embodiments, the invention is not restricted by the examples given and other variations can be derived therefrom by a person skilled in the art without departing from the protective scope of the invention.

LIST OF REFERENCE CHARACTERS

1 Communication system
V1, V2, V3 Security-relevant apparatus
S1, S2, S3, S4 Security class
PR1, PR2, PR3, PR4, PRn Private key
PU1, PU2, PU3, PU4, PUn Public key

The invention claimed is:

1. A method for exchanging messages between security-relevant apparatuses, which comprises the following steps of:
    a) providing the plurality of the security-relevant apparatuses to be linked to one another, each of the security-relevant apparatuses being assigned to a security class;
    b) assigning pairs of keys including a private key and a public key matching it to each said security class, the keys and the pairs of keys of each respective said security class differing from one another;
    c) making available public keys of each said security class for each of the security-relevant apparatuses;
    d) making available private keys for each of the security-relevant apparatuses, according to the security class that is lower than or equal to the security class of a respective security-relevant apparatus;
    e) sending and encrypting a message by a security-relevant apparatus with the private key of the security class that is available to the security-relevant apparatus; and
    f) receiving the message and identification of the security class of the message by decrypting the message by means of at least one of the security-relevant apparatuses with the public key of a same security class as the private key used for the encrypting in step e).

2. The method according to claim 1, wherein an encrypted message has an actual message content and an encrypted check value appended thereto.

3. The method according to claim 2, wherein an integrity check also takes place by checking an identity of a decrypted check value with a check value calculated from a transmitted message.

4. The method according to claim 2, wherein a decryption taking place by means of the security-relevant apparatus through a use of all the public keys of the different security classes until the encrypted message or the encrypted check value is decrypted by means of the public key of one said security class.

5. The method according to claim 1, wherein the security classes have a safety integrity level of 0, 1, 2, 3, 4.

6. The method according to claim 5, wherein at least one of the security-relevant apparatuses has a safety integrity level of greater than or equal to 1.

7. The method according to claim 1, wherein the private key multiplied by the public key from a same security class results in a residue class 1, wherein thereby an original check value or an original message is again obtained.

8. A non-transitory computer-readable storage medium having computer executable instructions which enable a data processing facility, once the computer executable instructions have been loaded into a storage medium of the data processing facility, to carry out a method for exchanging messages between security-relevant apparatuses, which comprises the following steps of:
    a) providing the plurality of security-relevant apparatuses to be linked to one another, each of the security-relevant apparatuses being assigned to a security class;
    b) assigning pairs of keys including a private key and a public key matching it to each said security class, the keys and the pairs of keys of each said security class differing from one another;
    c) making available public keys of each said security class for each of the security-relevant apparatuses;
    d) making available private keys for each of the security-relevant apparatuses, according to the security class that is lower than or equal to the security class of a respective security-relevant apparatus;

e) sending and encrypting a message by a security-relevant apparatus with the private key of the security class that is available to the security-relevant apparatus; and f) receiving the message and identification of the security class of the message by decrypting the message by means of at least one of the security-relevant apparatuses with the public key of a same security class as the private key used for encrypting in step e).

* * * * *